UNITED STATES PATENT OFFICE.

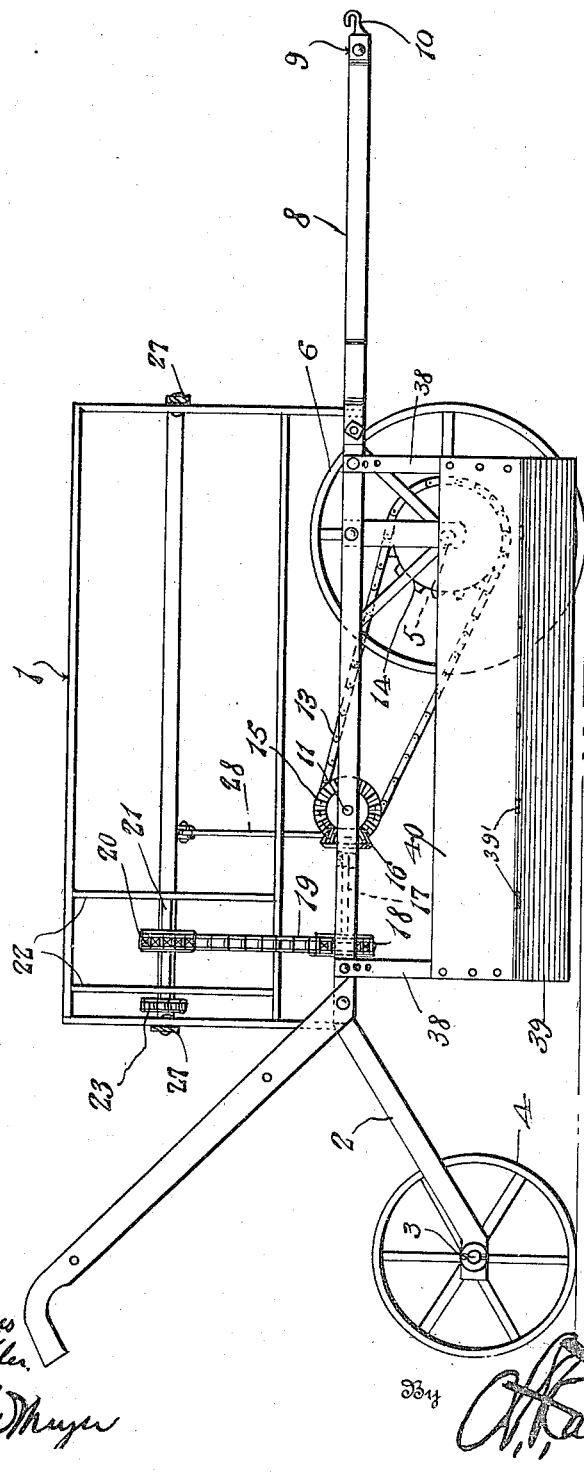

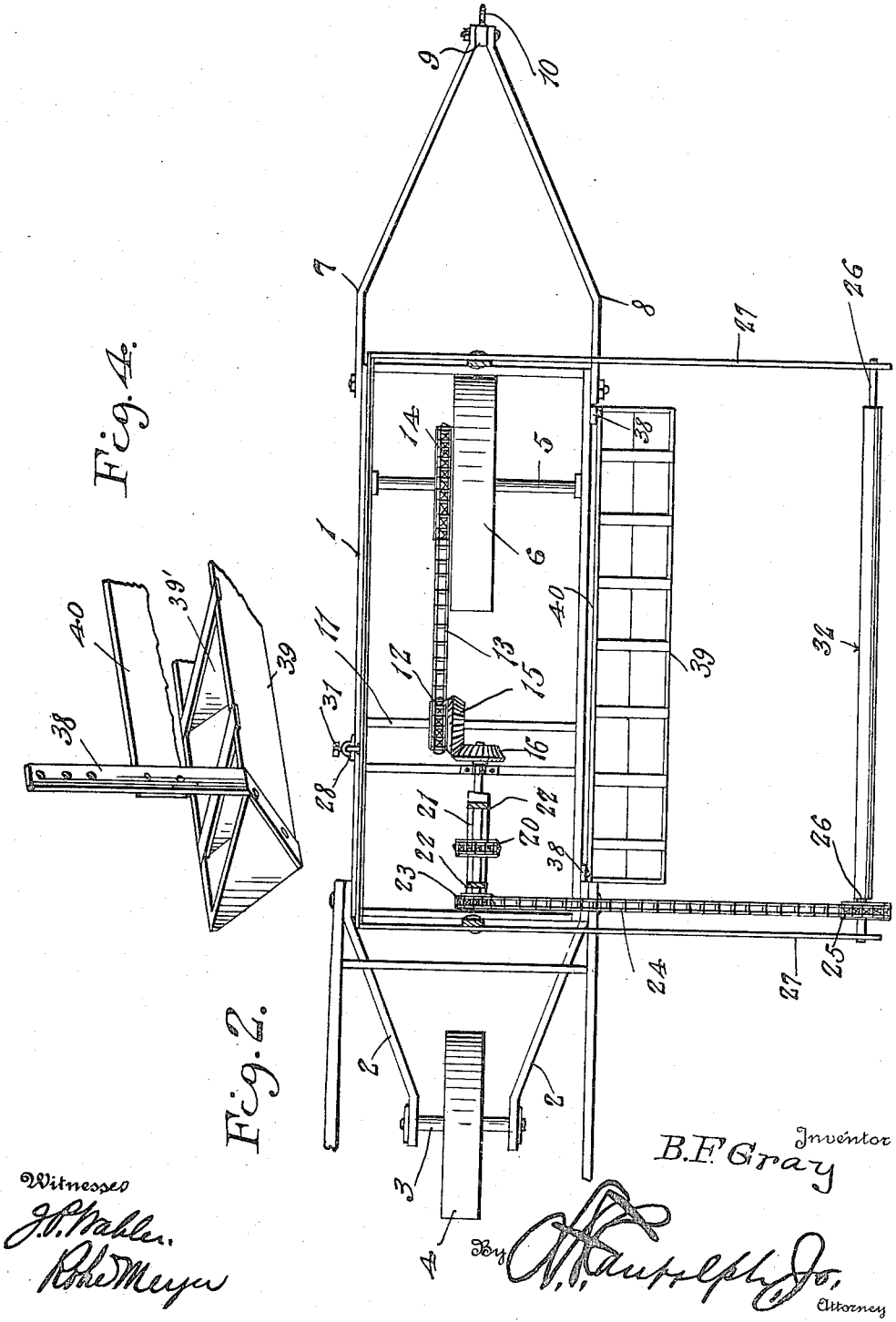

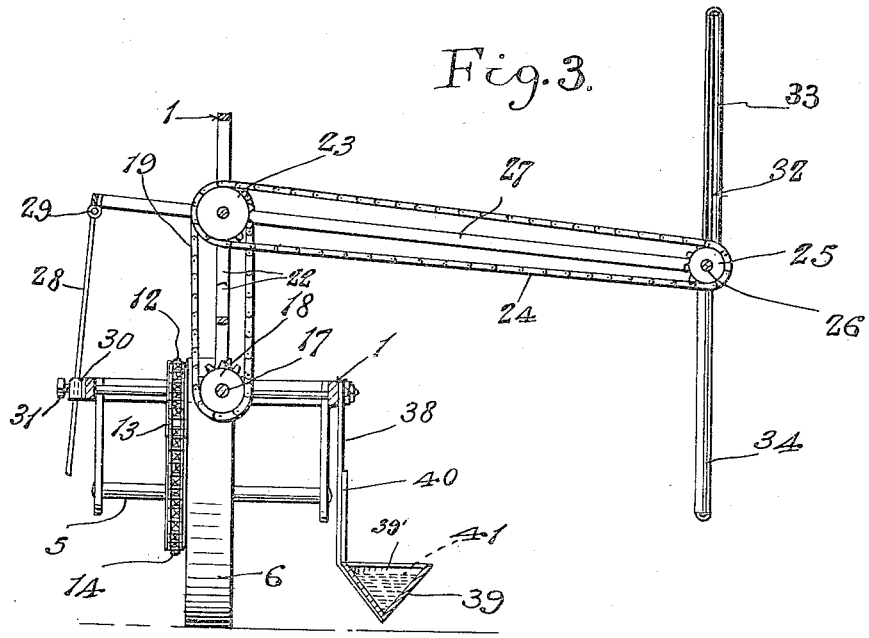
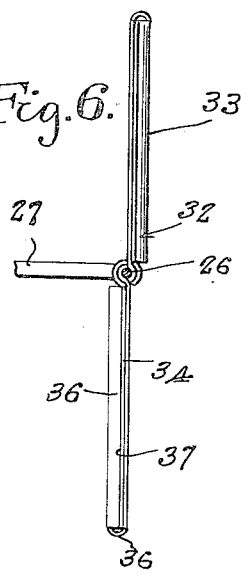
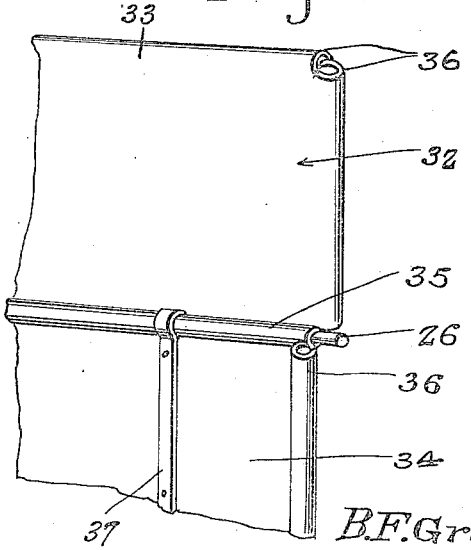

BENJAMIN F. GRAY, OF BLOCTON, ALABAMA.

BOLL-WEEVIL EXTERMINATOR.

1,226,505.  Specification of Letters Patent.  Patented May 15, 1917.

Application filed August 19, 1916. Serial No. 115,803.

*To all whom it may concern:*

Be it known that I, BENJAMIN F. GRAY, a citizen of the United States, residing at Blocton, in the county of Bibb and State of Alabama, have invented certain new and useful Improvements in Boll-Weevil Exterminators; and I do hereby declare the following to be a full, clear, and exact description of the invention, such as will enable others skilled in the art to which it appertains to make and use the same.

This invention relates to a device for exterminating boll weevil, and the primary object of the invention is to provide a device of this nature which is extremely simple in construction, and by means of which boll weevils, and other insects may be shaken from young cotton plants and destroyed.

Another object of this invention is to provide a boll weevil exterminator which includes a portable supporting structure having a liquid retaining trough supported at one side thereof a short distance above the ground, and to provide a reel which includes a pair of blades having their outer edges rounded, which reel is rotated by the travel of the exterminator for striking the plants and shaking them for shaking the weevils and other insects from the plant into the liquid carrying trough.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the improved boll weevil exterminator.

Fig. 2 is a top plan view of the exterminator.

Fig. 3 is a cross section through the exterminator.

Fig. 4 is a fragmentary perspective of the trough.

Fig. 5 is a fragmentary perspective of the reel, and

Fig. 6 is an edge view of the reel.

Referring more particularly to the drawings, 1 designates the supporting frame of the exterminator as an entirety, which frame has a pair of rearwardly extending arms 2. An axle 3 is carried by the rear end of the arms 2, and a supporting wheel 4 is mounted upon the axle.

An axle 5 is rotatably supported by the frame 1 and it has a supporting wheel 6 mounted thereon.

A pair of arms 7 and 8 extend forwardly from the front end of the supporting frame 1 and they converge toward their outer forward ends as clearly shown at 9 in Fig. 1 of the drawings. A clevis 10 is attached to the forward converging ends 9 of the arms 7 and 8 and it is provided for hitching a draft animal to the structure.

A shaft 11 is rotatably supported by the frame 1 rearwardly of the axle 5 and it has a sprocket wheel 12 mounted thereon about which a sprocket chain 13 travels. The sprocket chain 13 also travels about a sprocket 14 mounted upon the axle 5, whereby the shaft 11 will be rotated by the rotation of the supporting wheels 6. A bevel gear 15 is mounted upon the shaft 11 and meshes with a bevel gear 16, which is mounted upon a shaft 17. The shaft 17 extends substantially at right angles to the shaft 11. The shaft 17 has a sprocket 18 mounted thereon about which a sprocket chain 19 travels. The sprocket chain 19 also travels about a sprocket 20 which is mounted upon a shaft 21. The shaft 21 is rotatably supported by suitable brackets 22 carried by the supporting frame 1. A sprocket 23 is mounted upon the shaft 21 and a chain 24 travels about the sprocket 23 and a sprocket 25 which is mounted upon a reel carrying shaft 26. The shaft 26 is rotatably supported by suitable supporting arms 27 which are connected to and extend outwardly from the supporting frame 1. Bracing arms or braces 27 are pivotally connected to the frame 1, and they have rods 28 pivotally connected to their short ends as shown at 29, which rods adjustably extend through sprockets 30 carried by the frame 1. Set screws 31 are provided for engaging the rods 28 for holding them in various adjusted positions for regulating the height of the shaft 26 and consequently the reel structure 32 which is carried by the shaft 26.

The reel structure which is generically indicated by the numeral 32 includes wings 33 and 34, which are constructed of sheet metal or analogous material, and are rolled to form a circular bearing portion 35 which is mounted upon the shaft 26. The wings 33 and 34 have their edges rolled as indicated at 36, so as to form round edges for engagement with the cotton plant, for preventing mutilation of the plant by the reel structure. Suitable braces 37 are attached to the wings 33 and 34 for bracing and strengthening them.

A pair of hangers 38 are attached to the side of the frame 1 facing the reel structure 32. The hangers 38 depend from the frame 1 and have a trough 39 attached to their lower ends. The trough 39 is divided into separate chambers by a plurality of partitions which are arranged therein at spaced distances apart, and are designated as 39', these partitions being substantially V-shaped and preventing the liquid placed in the trough from splashing out. The hangers 38 are adjustably connected to the frame 1 so as to regulate the height of the trough 39 with respect to the frame 1 and also with respect to the ground over which the device is traveling. An apron 40 is attached to the hangers 38 and is provided for preventing the reel structure from knocking the boll weevils or other insects over the trough 39. The trough 39 is preferably filled with a liquid, such as kerosene oil or the like which will kill the boll weevils and other insects when they are deposited therein.

In the operation of the improved boll weevil exterminator, the device is drawn along side a row of young cotton plants, and the movement of the entire structure, will rotate the reel structure 32, through the medium of the sprockets 12 and 14, sprocket chains 13 and the power transmitting structure including the gears 15 and 16, sprocket chains 19 and 24, by the rotation of the wheel 6 so that one of the wings 33 or 34 of the wheel will strike the plants and bend them over toward the trough structure 39. The weevils and other insects, will, when the plants are bent over, be shaken from the plants and those striking the apron 40 will fall downwardly into the trough, and the remaining insects will be deposited directly into the trough, wherein the liquid 41 will kill them.

From the foregoing description taken in connection with the accompanying drawings the advantages of construction and of the method of operation of the improved boll weevil exterminator will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a boll weevil exterminator, a supporting frame, a pair of substantially horizontal arms pivotally carried by said frame for forming relatively long and short arms, a shaft rotatably carried by the end of the long arms, a reel mounted upon said shaft, means for rotating said reel, a rod pivotally connected to said short arms, a socket carried by said frame for receiving said rod, a set screw carried by said socket for engaging said rod for holding said reel in adjusted position, and a liquid retaining weevil receiving trough adjustably supported by said frame.

2. In a boll weevil exterminator, a supporting frame, a pair of substantially horizontal arms pivotally carried by said frame for forming relatively long and short arms, a shaft rotatably carried by the ends of the long arms, a reel mounted upon said shaft, means for rotating said reel, said reel being constructed of sheet metal and having a pair of oppositely extending wings, said wings having their edges rolled for providing rounded surfaces for engagement with plants, a rod pivotally connected to said short arms, a socket carried by said frame for receiving said rod, a set screw carried by said socket for engaging said rod for holding said reel in adjusted position, a liquid retaining weevil receiving trough adjustably supported by said frame, and a plurality of partitions placed within said trough for preventing splashing of liquid contained therein.

In testimony whereof I affix my signature in presence of two witnesses.

BENJAMIN F. GRAY.

Witnesses:
 B. N. GATLIN,
 MACK MEDDERS.

Copies of this patent may be obtained for five cents each, by addressing the "Commissioner of Patents, Washington, D. C."